United States Patent Office 3,119,662
Patented Jan. 28, 1964

3,119,662
STABILIZATION OF PHOSPHORIC ACID
Richard V. Viventi, Niskayuna Township, Schenectady County, N.Y., and Frank G. Hettler, Jr., Champaign, Ill., assignors to National Distillers and Chemical Corporation, New York, N.Y., a corporation of Virginia
No Drawing. Filed Sept. 1, 1961, Ser. No. 135,438
6 Claims. (Cl. 23—165)

This invention relates to a method for stabilizing phosphoric acid. More particularly, the invention pertains to the production of concentrated wet process phosphoric acid which is resistant to the formation of insoluble sludges during handling, storage, and use.

In one method of producing concentrated phosphoric acid, suitable for use in fertilizer manufacture, phosphate rock is acidulated with sulfuric acid to produce a dilute solution ranging from about 27 to 33 weight percent of $P_2O_5$, the solution is filtered to remove solid impurities such as gypsum, and the solution is then concentrated by evaporation to yield a commercial grade acid containing about 50 to 54 weight percent of $P_2O_5$. Concentration of dilute solution and subsequent storing of the concentrated products are attended by the gradual formation of an insoluble sludge. The formation of this sludge, which is known to consist chiefly of a complex compound of iron and aluminum phosphates with phosphoric acid, along with other impurities such as gypsum and silicofluorides, results in the loss of appreciable quantities of phosphoric acid which is recoverable only by involved and costly processes. The sludge also introduces equipment clogging with consequent process complications during the storage, handling and use of the concentrated acid. Post-precipitation often may continue during storage for several months. Presence of the sludge also results in an undesirably high viscosity of the concentrated acid thereby causing further problems in the transfer equipment employed in storage and use operations. The presence of sludge in the concentrated acid is particularly objectionable to the formulators of liquid fertilizers.

A number of prior processes have been proposed to eliminate the sludge problem, but have met with little success, particularly from a commercial standpoint. Most of these processes are based on precipitation and removal of the sludge and consequently, result in the loss of phosphoric acid and cause difficulties in the separation of the precipitate. Others involve the use of complex and costly stabilizing or sequestering agents; while still others involve expensive ion exchange processes.

Accordingly, it is one object of this invention to overcome the disadvantages of the prior art stabilization processes.

It is another object of this invention to provide a method whereby phosphoric acid which has been produced through the concentration of acidulated phosphate rock, i.e., the wet process, is stabilized against sludge formation during subsequent handling, storage, and use.

A further object is to simplify the purification and handling of phosphoric acid by stabilizing it so as to render it substantially sludge-free over a relatively long period of time and thereby prevent plugging of pipes, valves, nozzles, and the like.

Still another object is to prevent the loss of phosphatic values from concentrated phosphoric acid through sludge formation during storage, handling, and use.

A still further object of this invention is to provide a method for forming phosphoric acid which is especially suitable for use in making high analysis superphosphates for use in fertilizers.

These and other objects and advantages of this invention will become apparent to those skilled in the art from the following discussion and appended claims.

In general, this invention is a result of the discovery that the addition of a minor but sufficient amount of sulfuric acid to clarified concentrated wet process phosphoric acid inhibits the formation of sludge during subsequent storage, handling, and use.

The sulfuric acid suitable for practice of this invention can be any of the well-known commercial products including spent acid from other chemical processes. Because introduction of water along with the sulfuric acid to the concentrated phosphoric acid would reduce the phosphoric acid concentration, it is preferred to add the sulfuric acid in as high a concentration as practicable. Generally, sulfuric acid containing at least about 60 weight percent $H_2SO_4$ is satisfactory. More preferably, the sulfuric acid should contain at least about 93 percent $H_2SO_4$.

The practice of the subject invention is applicable to a range of $P_2O_5$ concentration wherein the formation of sludge is a problem. For example, in wet process phosphoric acids concentrated up to about 40 weight percent $P_2O_5$ or below, sludge formation, although slight, may be undesirable for particular applications. In such acids, sludge formation can be inhibited completely or substantially minimized by adding sulfuric acid according to this invention. However, the primary advantages of the subject process are realized at $P_2O_5$ concentrations wherein sludge formation is a major consideration, as for example, at concentrations of $P_2O_5$ above about 40 weight percent, and especially between about 50 to 60 weight percent.

The sulfuric acid can be added to the clarified concentrated phosphoric acid in any convenient manner, as for example, when the acid is being pumped into tanks for storage or for shipment. The sulfuric acid may be diluted, if desired, with a relatively small quantity of the phosphoric acid prior to admixture with the main portion of phosphoric acid.

It has also been found that when the phosphoric acid contains an appreciable amount of precipitated material, as is the case with aged or concentrated phosphoric acid, the acid can be first heated to effect solution of part or all of the precipitate. The precipitate which remains, if any, can be removed by filtration, centrifugation, or the like and the clarified acid treated in accordance with this invention.

In another and more preferred method of operation, the solids formed during the concentration process are digested by means of a brief aging period at or slightly above ambient temperature, the solids are then separated by filtration, centrifugation, decantation, and the like, and the resultant clarified acid then treated with the sulfuric acid. Aging periods of at least about one day (24 hours) and preferably between one to two days (24 to 48 hours) are satisfactory. Aging temperatures from ambient temperature up to about 50° C., and preferably, up to about 40° C. are suitable. At higher temperatures, the digestion of the precipitate is unnecessarily prolonged while at lower temperatures, costly cooling equipment would be required. It has further been found that gentle agitation applied during the aging step enhances the precipitation and filterability of the solids. Such agitation may be provided by any convenient means, as for example, by air sparging, pumping, stirring, and the like.

The amount of sulfuric acid to be used to inhibit sludge formation in the phosphoric acid will depend upon several factors, such as the amount of impurities present in the acid, the concentration of the acid, the quantity of free sulfuric acid present prior to the separation of precipitate from the concentrated phosphoric acid, the age of the acid, the prior or subsequent treatment of the acid, the use of the acid, etc. Consequently, the limits of the amounts of sulfuric acid to be added to the clarified concentrated phosphoric acid are most practicably expressed in general terms, the amount of sulfuric acid to be added being an amount sufficient to inhibit the formation of sludge during storage, handling, or use of the concentrated phosphoric acid. Those skilled in the art will be able to determine the particular amounts of sulfuric acid to be added by simple routine tests. Generally, the amount to be added will fall in the range of 0.5 to 5 weight percent of sulfuric acid, based on the weight of the clarified phosphoric acid.

A particular concentration of $P_2O_5$ will ordinarily be desired in the stabilized clarified phosphoric acid. Consequently, adjustment or allowance must be made for the dilution effect of the sulfuric acid added. Preferably this is done by concentrating the phosphoric acid to such a $P_2O_5$ level that following clarification and addition of the required quantity of sulfuric acid, the desired $P_2O_5$ level is achieved. It is possible to add the sulfuric acid to the clarified concentrated phosphoric acid and then adjust for the dilution effect by further concentration to the desired $P_2O_5$ level. However, this latter technique not only unnecessarily complicates the process, but also leads to somewhat poorer stabilization against sludge formation.

The invention can be readily illustrated by reference to the following examples.

EXAMPLE I

A wet process phosphoric acid, produced from the acidulation of Florida land pebble rock and containing about 28 weight percent $P_2O_5$ and about 9 percent iron and aluminum phosphates, based on the $P_2O_5$, was concentrated by evaporation to a $P_2O_5$ content of about 52 weight percent. Four 3500 ml. portions of this acid were charged to four-liter Erlenmeyer flasks, designated as (a), (b), (c) and (d), and treated as follows:

(a) Not filtered and not treated.
(b) Filtered after aging one day undisturbed at room temperature.
(c) Filtered after aging one day undisturbed at room temperature. 2 wt. percent conc. $H_2SO_4$ (93%) added to filtrate.
(d) Filtered after aging one day undisturbed at room temperature. 5 wt. percent conc. $H_2SO_4$ (93%) added to filtrate.

The solutions were allowed to stand undisturbed for a period of 39 days. At periodic intervals the resultant suspensions were briefly agitated and 100 ml. samples withdrawn. The weight percent of solids which had formed was determined by filtering the sample, washing the residue with pure phosphoric acid and ethanol, and then drying the residue at 50° C.

The following table compares the relative rates of sludge formation for the untreated phosphoric acid and for the phosphoric acid to which various amounts of concentrated sulfuric acid were added.

Table I

| Days Aging | Weight Percent Solids | | | |
|---|---|---|---|---|
| | (a) Unfiltered Untreated | (b) Filtered Untreated | (c) Filtered 2 wt. percent $H_2SO_4$ | (d) Filtered 5 wt. percent $H_2SO_4$ |
| 1 | 0.18 | 0.00 | 0.00 | 0.00 |
| 4 | 0.42 | 0.03 | 0.01 | 0.00 |
| 7 | 0.63 | 0.02 | 0.01 | 0.00 |
| 11 | 0.67 | 0.03 | 0.01 | 0.01 |
| 14 | 0.83 | 0.16 | 0.03 | 0.02 |
| 25 | 1.00 | 0.28 | 0.01 | 0.01 |
| 39 | 1.32 | 0.66 | 0.01 | 0.02 |

A composite sample of the sludge recovered from the unfiltered and untreated sample yielded the following analysis:

| | Percent |
|---|---|
| $P_2O_5$ | 46.96 |
| $FePO_4 + AlPO_4$ | 41.08 |
| CaO | 5.47 |
| $SO_3$ | 6.39 |
| Na | 0.91 |
| F | 2.35 |
| $H_2O$ | 2.62 |

The above results demonstrate that sludge formation and the accompanying loss in phosphatic values can be effectively inhibited for prolonged periods of time through the addition of small amounts of concentrated sulfuric acid to clarified concentrated wet process phosphoric acid.

EXAMPLE II

To test the effect of agitation on the aging of concentrated phosphoric acid, two aliquots of an acid containing 1.32 weight percent solids were aged at room temperature, one being left undisturbed and the other stirred continuously. At periodic intervals, the samples were analyzed for solids content. The results (see Table II) demonstrate that agitation of the concentrated phosphoric acid during the aging period prior to clarification and addition of sulfuric acid enhances the separation of solids formed during the concentration step.

Table II

| Days Aging | Weight Percent Solids | |
|---|---|---|
| | Undisturbed | Agitated |
| 0 | 1.32 | 1.32 |
| 1 | 1.41 | 1.50 |
| 2 | 1.58 | 2.31 |
| 4 | 2.40 | 3.46 |

While particular embodiments of this invention are shown above, it will be understood that the invention is obviously subject to variations and modifications without departing from its broader aspects.

What is claimed is:

1. A method for stabilizing concentrated phosphoric acid which comprises aging said concentrated phosphoric acid for a time period of at least 1 day at temperatures ranging from ambient temperatures up to 50° C., separating sludge from said aged phosphoric acid, adding to the resulting clarified phosphoric acid an amount of concentrated sulfuric acid sufficient to inhibit sludge formation within the range of about 0.5 to 5.0 weight percent, based on the weight of the phosphoric acid.

2. The method of claim 1 wherein said concentrated phosphoric acid is aged at a temperature up to 40° C. for a time period ranging from 1 to 2 days.

3. The method of claim 2 wherein said concentrated phosphoric acid is agitated during said aging period.

4. A method for stabilizing phosphoric acid having a $P_2O_5$ concentration of about 50 to 60 weight percent which comprises aging said phosphoric acid for about 1 to 2 days at temperatures ranging from ambient temperatures up to 50° C., separating any sludge which formed during the aging period from the aged phosphoric acid, adding to the resulting clarified phosphoric acid about 0.5 to 5.0 weight percent concentrated sulfuric acid based on the weight of the phosphoric acid, and recovering phosphoric acid stabilized against subsequent sludge formation.

5. The method of claim 4 wherein said concentrated phosphoric acid is agitated during said aging period.

6. The method of claim 4 wherein said sulfuric acid has a concentration of at least 93 percent.

References Cited in the file of this patent

UNITED STATES PATENTS

| | | |
|---|---|---|
| 1,648,137 | Larison | Nov. 8, 1927 |
| 2,929,777 | Clevenger | Mar. 22, 1960 |
| 3,027,236 | Cosway et al. | Mar. 27, 1962 |